US010762471B1

(12) United States Patent
Wang et al.

(10) Patent No.: US 10,762,471 B1
(45) Date of Patent: Sep. 1, 2020

(54) AUTOMATING MANAGEMENT OF INTEGRATED WORKFLOWS BASED ON DISPARATE SUBSIDIARY DATA SOURCES

(71) Applicant: Palantir Technologies Inc., Palo Alto, CA (US)

(72) Inventors: Xinyi Wang, Palo Alto, CA (US); Ankit Shankar, Redwood City, CA (US); Arthur Thouzeau, London (GB); Benedict Cappellacci, New York, NY (US); Issei Nino, New York, NY (US); Matthew Rauen, Palo Alto, CA (US); Michal Duczynski, Pecice (PL); Sebastiaan Visser, Amsterdam (NL); Sorin-Alexandru Nutu, Iasi (RO); Spencer Tank, Princeton, NJ (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/402,064

(22) Filed: Jan. 9, 2017

(51) Int. Cl.
*G06Q 10/10* (2012.01)
*G06F 3/0482* (2013.01)
(Continued)

(52) U.S. Cl.
CPC ......... *G06Q 10/103* (2013.01); *G06F 3/0482* (2013.01); *G06F 16/211* (2019.01);
(Continued)

(58) Field of Classification Search
None
See application file for complete search history.

(56) References Cited

U.S. PATENT DOCUMENTS

| 5,515,488 A | 5/1996 | Hoppe et al. |
| 6,430,305 B1 | 8/2002 | Decker |

(Continued)

FOREIGN PATENT DOCUMENTS

| CN | 102546446 | 7/2012 |
| CN | 103167093 | 6/2013 |

(Continued)

OTHER PUBLICATIONS

Bradenburg. "What is Data Mapping?". Mar. 29, 2016 snapshot via Archive.org. URL Link: http://www.bridging-the-gap.com/what-is-data-mapping/. Accessed Jul. 2018. (Year: 2016).*

(Continued)

*Primary Examiner* — Neveen Abel Jalil
*Assistant Examiner* — Irene Baker
(74) *Attorney, Agent, or Firm* — Sheppard Mullin Richter & Hampton LLP

(57) ABSTRACT

Methods, systems, and computer-readable media described herein may include: obtaining first data from a first datastore managed by a first entity, the first data comprising a first status of a first task of a first subsidiary workflow that is part of an integrated workflow; integrating the first data into a second datastore managed by a second entity that manages the integrated workflow, with an integration layer; generating a graphical user interface to present an interactive graphical object that displays the integrated first data and the integrated workflow to a user; receiving one or more updates from the user to the integrated first data, where the one or more updates are based on one or more graphical user interactions with the integrated first data; identifying a change to a portion of the first data; and writing the change in the first datastore using the integration layer interface.

15 Claims, 10 Drawing Sheets

(51) Int. Cl.
  *G06F 16/22*      (2019.01)
  *G06F 16/21*      (2019.01)
  *G06F 16/27*      (2019.01)
  *G06Q 50/04*      (2012.01)
  *G06Q 50/30*      (2012.01)

(52) U.S. Cl.
  CPC ............ *G06F 16/22* (2019.01); *G06F 16/275*
        (2019.01); *G06Q 50/04* (2013.01); *G06Q*
                                *50/30* (2013.01)

(56) References Cited

U.S. PATENT DOCUMENTS

| | | |
|---|---|---|
| 6,820,135 B1 | 11/2004 | Dingman |
| 6,978,419 B1 | 12/2005 | Kantrowitz |
| 6,980,984 B1 | 12/2005 | Huffman et al. |
| 7,168,039 B2 | 1/2007 | Bertram |
| 7,461,077 B1 | 12/2008 | Greenwood |
| 7,617,232 B2 | 11/2009 | Gabbert et al. |
| 7,756,843 B1 | 7/2010 | Palmer |
| 7,899,796 B1 | 3/2011 | Borthwick et al. |
| 7,917,376 B2 | 3/2011 | Bellin et al. |
| 7,941,321 B2 | 5/2011 | Greenstein et al. |
| 8,036,971 B2 | 10/2011 | Aymeloglu et al. |
| 8,037,046 B2 | 10/2011 | Udezue et al. |
| 8,046,283 B2 | 10/2011 | Burns |
| 8,054,756 B2 | 11/2011 | Chand et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,386,377 B1 | 2/2013 | Xiong et al. |
| 8,473,454 B2 | 6/2013 | Evanitsky et al. |
| 8,484,115 B2 | 7/2013 | Aymeloglu et al. |
| 8,489,641 B1 | 7/2013 | Seefeld et al. |
| 8,577,911 B1 | 11/2013 | Stepinski et al. |
| 8,589,273 B2 | 11/2013 | Creeden et al. |
| 8,688,573 B1 | 4/2014 | Ruknoic et al. |
| 8,744,890 B1 | 6/2014 | Bernier |
| 8,799,799 B1 | 8/2014 | Cervelli et al. |
| 8,806,355 B2 | 8/2014 | Twiss et al. |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 9,069,842 B2 | 6/2015 | Melby |
| 9,100,428 B1 | 8/2015 | Visbal |
| 9,111,281 B2 | 8/2015 | Stibel et al. |
| 9,128,995 B1* | 9/2015 | Fletcher ............ G06F 17/30572 |
| 9,129,219 B1 | 9/2015 | Robertson et al. |
| 9,256,664 B2 | 2/2016 | Chakerian et al. |
| 9,280,618 B1 | 3/2016 | Bruce et al. |
| 9,286,373 B2 | 3/2016 | Elliot et al. |
| 9,335,911 B1 | 5/2016 | Elliot et al. |
| 2002/0065708 A1 | 5/2002 | Senay et al. |
| 2002/0087381 A1* | 7/2002 | Freeman .......... G06Q 10/06311 |
| | | 705/7.13 |
| 2002/0095360 A1 | 7/2002 | Joao |
| 2002/0095658 A1 | 7/2002 | Shulman |
| 2002/0103705 A1 | 8/2002 | Brady |
| 2002/0147805 A1 | 10/2002 | Leshem et al. |
| 2003/0126102 A1 | 7/2003 | Borthwick |
| 2003/0237057 A1* | 12/2003 | Riedl .................... G06F 17/50 |
| | | 716/105 |
| 2004/0034570 A1 | 2/2004 | Davis |
| 2004/0078258 A1* | 4/2004 | Schulz .................. G06Q 10/06 |
| | | 717/104 |
| 2004/0111480 A1 | 6/2004 | Yue |
| 2004/0122709 A1* | 6/2004 | Avinash ................ G06F 19/322 |
| | | 705/2 |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0086207 A1 | 4/2005 | Heuer et al. |
| 2005/0154628 A1 | 7/2005 | Eckart et al. |
| 2005/0154769 A1 | 7/2005 | Eckart et al. |
| 2006/0026120 A1 | 2/2006 | Carolan et al. |
| 2006/0026170 A1 | 2/2006 | Kreitler et al. |
| 2006/0080283 A1 | 4/2006 | Shipman |
| 2006/0085412 A1* | 4/2006 | Johnson .............. G06F 16/256 |
| 2006/0143034 A1 | 6/2006 | Rothermel |
| 2006/0143075 A1 | 6/2006 | Carr et al. |
| 2006/0143079 A1 | 6/2006 | Basak et al. |
| 2007/0000999 A1 | 1/2007 | Kubo et al. |
| 2007/0011304 A1 | 1/2007 | Error |
| 2007/0038646 A1 | 2/2007 | Thota |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0185867 A1 | 8/2007 | Maga |
| 2007/0192122 A1 | 8/2007 | Routson et al. |
| 2007/0284433 A1 | 12/2007 | Domenica et al. |
| 2008/0004925 A1* | 1/2008 | Bangel ............ G06Q 10/06313 |
| | | 705/7.23 |
| 2008/0065655 A1 | 3/2008 | Chakravarthy et al. |
| 2008/0069081 A1 | 3/2008 | Chand et al. |
| 2008/0077642 A1 | 3/2008 | Carbone et al. |
| 2008/0103996 A1 | 5/2008 | Forman et al. |
| 2008/0109235 A1* | 5/2008 | Binnie .................... G06Q 10/06 |
| | | 705/7.11 |
| 2008/0208735 A1 | 8/2008 | Balet et al. |
| 2008/0222295 A1 | 9/2008 | Robinson et al. |
| 2008/0243711 A1 | 10/2008 | Aymeloglu et al. |
| 2008/0255973 A1 | 10/2008 | El Wade et al. |
| 2008/0270328 A1 | 10/2008 | Lafferty et al. |
| 2008/0294663 A1 | 11/2008 | Heinley et al. |
| 2008/0313132 A1 | 12/2008 | Hao et al. |
| 2009/0076845 A1 | 3/2009 | Bellin et al. |
| 2009/0094166 A1 | 4/2009 | Aymeloglu et al. |
| 2009/0094270 A1 | 4/2009 | Alirez et al. |
| 2009/0106178 A1 | 4/2009 | Chu |
| 2009/0112745 A1 | 4/2009 | Stefanescu |
| 2009/0125359 A1 | 5/2009 | Knapic |
| 2009/0125459 A1 | 5/2009 | Norton et al. |
| 2009/0132953 A1 | 5/2009 | Reed et al. |
| 2009/0157732 A1 | 6/2009 | Hao et al. |
| 2009/0187546 A1 | 7/2009 | Whyte et al. |
| 2009/0187548 A1 | 7/2009 | Ji et al. |
| 2009/0249244 A1 | 10/2009 | Robinson et al. |
| 2009/0254842 A1 | 10/2009 | Leacock et al. |
| 2009/0259636 A1 | 10/2009 | Labrou et al. |
| 2009/0271343 A1 | 10/2009 | Vaiciulis et al. |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319515 A1 | 12/2009 | Minton et al. |
| 2009/0319891 A1 | 12/2009 | MacKinlay |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0057757 A1* | 3/2010 | Blondi .................. G06F 9/5038 |
| | | 707/E17.009 |
| 2010/0070842 A1 | 3/2010 | Aymeloglu et al. |
| 2010/0098318 A1 | 4/2010 | Anderson |
| 2010/0106752 A1 | 4/2010 | Eckardt et al. |
| 2010/0114887 A1 | 5/2010 | Conway et al. |
| 2010/0131502 A1 | 5/2010 | Fordham |
| 2010/0161735 A1 | 6/2010 | Sharma |
| 2010/0191563 A1 | 7/2010 | Schlaifer et al. |
| 2010/0211535 A1 | 8/2010 | Rosenberger |
| 2010/0235915 A1 | 9/2010 | Memon et al. |
| 2010/0250322 A1* | 9/2010 | Norwood ............ G06Q 10/06 |
| | | 705/7.21 |
| 2010/0257015 A1* | 10/2010 | Molander .......... G06Q 10/1097 |
| | | 705/7.21 |
| 2010/0262688 A1 | 10/2010 | Hussain et al. |
| 2010/0293174 A1 | 11/2010 | Bennett et al. |
| 2010/0312837 A1 | 12/2010 | Bodapati et al. |
| 2011/0022435 A1* | 1/2011 | Reid ........................ G06F 8/30 |
| | | 705/7.27 |
| 2011/0040776 A1 | 2/2011 | Najm et al. |
| 2011/0061013 A1 | 3/2011 | Bilicki et al. |

(56) References Cited

U.S. PATENT DOCUMENTS

| | | |
|---|---|---|
| 2011/0078173 A1 | 3/2011 | Seligmann et al. |
| 2011/0087632 A1* | 4/2011 | Subramanian .... G06F 17/30578 707/610 |
| 2011/0093327 A1 | 4/2011 | Fordyce, III et al. |
| 2011/0099133 A1 | 4/2011 | Chang et al. |
| 2011/0153384 A1 | 6/2011 | Horne et al. |
| 2011/0173093 A1 | 7/2011 | Psota et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218955 A1 | 9/2011 | Tang |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0089606 A1 | 4/2012 | Eshwar et al. |
| 2012/0131512 A1 | 5/2012 | Takeuchi et al. |
| 2012/0144335 A1 | 6/2012 | Abeln et al. |
| 2012/0158527 A1 | 6/2012 | Cannelongo et al. |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0323888 A1 | 12/2012 | Osann, Jr. |
| 2013/0016106 A1 | 1/2013 | Yip et al. |
| 2013/0054306 A1 | 2/2013 | Bhalla |
| 2013/0055145 A1 | 2/2013 | Antony et al. |
| 2013/0057551 A1 | 3/2013 | Ebert et al. |
| 2013/0057587 A1* | 3/2013 | Leonard ................ G06F 3/0488 345/660 |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0218879 A1 | 8/2013 | Park et al. |
| 2013/0226318 A1 | 8/2013 | Procyk |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0318604 A1 | 11/2013 | Coates et al. |
| 2014/0012796 A1 | 1/2014 | Petersen et al. |
| 2014/0040371 A1 | 2/2014 | Gurevich et al. |
| 2014/0053091 A1 | 2/2014 | Hou et al. |
| 2014/0058914 A1 | 2/2014 | Song et al. |
| 2014/0068487 A1 | 3/2014 | Steiger et al. |
| 2014/0095509 A1 | 4/2014 | Patton |
| 2014/0108380 A1 | 4/2014 | Gotz et al. |
| 2014/0108985 A1 | 4/2014 | Scott et al. |
| 2014/0122416 A1* | 5/2014 | Leto ................. G06F 17/30377 707/607 |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0189870 A1 | 7/2014 | Singla et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0280056 A1 | 9/2014 | Kelly |
| 2014/0282160 A1 | 9/2014 | Zarpas |
| 2014/0282409 A1* | 9/2014 | Nassar ................. G06F 11/362 717/124 |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0081841 A1* | 3/2015 | Pino .................... H04L 67/1095 709/217 |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0177952 A1* | 6/2015 | Meyer ................. G06F 3/04842 715/739 |
| 2015/0188872 A1 | 7/2015 | White |
| 2015/0242401 A1 | 8/2015 | Liu |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0180557 A1 | 6/2016 | Yousaf et al. |
| 2016/0188134 A1* | 6/2016 | Azmoon .............. G06Q 10/103 715/781 |
| 2016/0189077 A1* | 6/2016 | Azmoon .......... G06Q 10/06316 705/7.26 |
| 2017/0004438 A1* | 1/2017 | Park ............... G06Q 10/063118 |
| 2017/0116206 A1* | 4/2017 | Gumerato ........... H04L 67/1095 |

FOREIGN PATENT DOCUMENTS

| | | |
|---|---|---|
| CN | 102054015 | 5/2014 |
| DE | 102014204827 | 9/2014 |
| DE | 102014204830 | 9/2014 |
| DE | 102014204834 | 9/2014 |
| EP | 2487610 | 8/2012 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| EP | 2996053 | 3/2016 |
| EP | 3035214 | 6/2016 |
| EP | 3038002 | 6/2016 |
| EP | 3040885 | 7/2016 |
| WO | WO 2005/116851 | 12/2005 |
| WO | WO 2012/061162 | 5/2012 |

OTHER PUBLICATIONS

Leon. "Microsoft SharePoint Server 2007 Bible". Published Jun. 12, 2007. Wiley India Pvt., Ltd. ISBN: 978-8126513239. "Configuring BI Dashboards", pp. 434-452. Accessed Jul. 2018. (Year: 2007).*

Rombaut. "The Benefits of Syncing Your Business Data". Piesync. Published May 11, 2016. URL Link: https://www.piesync.com/blog/the-benefits-of-syncing-your-business-data/. Accessed Jul. 2018. (Year: 2016).*

Voyteck et al. "Pro SQL Server 2008 Reporting Services". Published Aug. 21, 2008. Apress. ISBN: 978-1430217305. Chapter 6, "Rendering Reports from .NET Applications". Accessed Jul. 2018. (Year: 2008).*

(56) References Cited

OTHER PUBLICATIONS

W3Schools.com. "HTML5 Drag and Drop". Dec. 2, 2016 snapshot via Archive.org. URL Link: https://www.w3schools.com/htmL/html5_draganddrop.asp. Accessed Jul. 2018. (Year: 2016).*
Wikipedia. "Database connection". Nov. 16, 2016 snapshot via Archive.org. URL Link: https://en.wikipedia.org/wiki/Database_connection. Accessed Jul. 2018. (Year: 2016).*
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
"SAP BusinessObjects Explorer Online Help," Mar. 19, 2012, retrieved on Apr. 21, 2016 http://help.sap.com/businessobject/product_guides/boexir4/en/xi4_exp_user_en.pdf.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Appacts, "Smart Thinking for Super Apps," <http://www.appacts.com> Printed Jul. 18, 2013 in 4 pages.
Apsalar, "Data Powered Mobile Advertising," "Free Mobile App Analytics" and various analytics related screen shots <http://apsalar.com> Printed Jul. 18, 2013 in 8 pages.
Capptain—Pilot Your Apps, <http://www.capptain.com> Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chaudhuri et al., "An Overview of Business Intelligence Technology," Communications of the ACM, Aug. 2011, vol. 54, No. 8.
Cohn, et al., "Semi-supervised clustering with user feedback," Constrained Clustering: Advances in Algorithms, Theory, and Applications 4.1 (2003): 17-32.
Countly Mobile Analytics, <http://count.ly/> Printed Jul. 18, 2013 in 9 pages.
Distimo—App Analytics, <http://www.distimo.com/app-analytics> Printed Jul. 18, 2013 in 5 pages.
Flurry Analytics, <http://www.flurry.com/> Printed Jul. 18, 2013 in 14 pages.
Gill et al., "Computerised Linking of Medical Records: Methodological Guidelines,".
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation", Grant 98-IJ-CX-K005, May 6, 2002, 37 pages.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hua et al., "A Multi-attribute Data Structure with Parallel Bloom Filters for Network Services", HiPC 2006, LNCS 4297, pp. 277-288, 2006.
Janssen, Jan-Keno, "Wo bist'n du?—Googles Geodienst Latitude," Jan. 17, 2011, pp. 86-88, retrieved from the internet on Jul. 30, 2015 http://www.heise.de/artikel-archiv/ct/2011/03/086/@00250@ct.11.03.086-088.pdf.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kontagent Mobile Analytics, <http://www.kontagent.com/> Printed Jul. 18, 2013 in 9 pages.
Localytics—Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
Mixpanel—Mobile Analytics, <https://mixpanel.com/> Printed Jul. 18, 2013 in 13 pages.
Notice of Allowance for U.S. Appl. No. 14/225,084 dated May 4, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/479,863 dated Mar. 31, 2015.
Notice of Allowance for U.S. Appl. No. 14/483,527 dated Apr. 29, 2016.
Notice of Allowance for U.S. Appl. No. 14/552,336 dated Nov. 3, 2015.
Notice of Allowance for U.S. Appl. No. 14/746,671 dated Jan. 21, 2016.
Notice of Allowance for U.S. Appl. No. 14/858,647 dated Mar. 4, 2016.
Official Communication for European Patent Application No. 14187996.5 dated Feb. 19, 2016.
Official Communication for European Patent Application No. 14187996.5 dated Feb. 12, 2015.
Official Communication for European Patent Application No. 14191540.5 dated May 27, 2015.
Official Communication for European Patent Application No. 14200246.8 dated May 29, 2015.
Official Communication for European Patent Application No. 14200298.9 dated May 13, 2015.
Official Communication for European Patent Application No. 15181419.1 dated Sep. 29, 2015.
Official Communication for European Patent Application No. 15184764.7 dated Dec. 14, 2015.
Official Communication for European Patent Application No. 15200073.3 dated Mar. 30, 2016.
Official Communication for European Patent Application No. 15201924.6 dated Apr. 25, 2016.
Official Communication for European Patent Application No. 16152984.7 dated Mar. 24, 2016.
Official Communication for Great Britain Patent Application No. 1404499.4 dated Aug. 20, 2014.
Official Communication for Great Britain Patent Application No. 1404499.4 dated Jun. 11, 2015.
Official Communication for Great Britain Patent Application No. 1404489.5 dated Aug. 27, 2014.
Official Communication for Great Britain Patent Application No. 1404486.1 dated May 21, 2015.
Official Communication for Great Britain Patent Application No. 1404499.4 dated Sep. 29, 2014.
Official Communication for Great Britain Patent Application No. 1404486.1 dated Aug. 27, 2014.
Official Communication for Great Britain Patent Application No. 1404489.5 dated Oct. 6, 2014.
Official Communication for Great Britain Patent Application No. 1404489.5 dated May 21, 2015.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012438 dated Sep. 21, 2015.
Official Communication for New Zealand Patent Application No. 622473 dated Mar. 27, 2014.

(56) References Cited

OTHER PUBLICATIONS

Official Communication for New Zealand Patent Application No. 622513 dated Apr. 3, 2014.
Official Communication for New Zealand Patent Application No. 622473 dated Jun. 19, 2014.
Official Communication for New Zealand Patent Application No. 628161 dated Aug. 25, 2014.
Official Communication for U.S. Appl. No. 13/827,491 dated Dec. 1, 2014.
Official Communication for U.S. Appl. No. 13/827,491 dated Oct. 9, 2015.
Official Communication for U.S. Appl. No. 13/827,491 dated Jun. 22, 2015.
Official Communication for U.S. Appl. No. 14/141,252 dated Oct. 8, 2015.
Official Communication for U.S. Appl. No. 14/141,252 dated Apr. 14, 2016.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,006 dated Sep. 2, 2015.
Official Communication for U.S. Appl. No. 14/225,006 dated Sep. 10, 2014.
Official Communication for U.S. Appl. No. 14/225,084 dated Feb. 26, 2016.
Official Communication for U.S. Appl. No. 14/225,084 dated Feb. 20, 2015.
Official Communication for U.S. Appl. No. 14/225,084 dated Sep. 2, 2014.
Official Communication for U.S. Appl. No. 14/225,084 dated Sep. 11, 2015.
Official Communication for U.S. Appl. No. 14/225,084 dated Jan. 4, 2016.
Official Communication for U.S. Appl. No. 14/225,160 dated Jan. 25, 2016.
Official Communication for U.S. Appl. No. 14/225,160 dated Aug. 12, 2015.
Official Communication for U.S. Appl. No. 14/225,160 dated Jul. 29, 2014.
Official Communication for U.S. Appl. No. 14/225,160 dated May 20, 2015.
Official Communication for U.S. Appl. No. 14/225,160 dated Feb. 11, 2015.
Official Communication for U.S. Appl. No. 14/225,160 dated Oct. 22, 2014.
Official Communication for U.S. Appl. No. 14/225,160 dated Apr. 22, 2016.
Official Communication for U.S. Appl. No. 14/225,160 dated Jun. 16, 2016.
Official Communication for U.S. Appl. No. 14/306,138 dated Dec. 24, 2015.
Official Communication for U.S. Appl. No. 14/306,138 dated Dec. 3, 2015.
Official Communication for U.S. Appl. No. 14/306,147 dated Dec. 24, 2015.
Official Communication for U.S. Appl. No. 14/319,161 dated Jan. 23, 2015.
Official Communication for U.S. Appl. No. 14/319,765 dated Feb. 1, 2016.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated Dec. 9, 2015.
Official Communication for U.S. Appl. No. 14/463,615 dated May 21, 2015.
Official Communication for U.S. Appl. No. 14/463,615 dated Nov. 13, 2014.
Official Communication for U.S. Appl. No. 14/463,615 dated Jan. 28, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/552,336 dated Jul. 20, 2015.
Official Communication for U.S. Appl. No. 14/562,524 dated Sep. 14, 2015.
Official Communication for U.S. Appl. No. 14/562,524 dated Nov. 10, 2015.
Official Communication for U.S. Appl. No. 14/571,098 dated Feb. 23, 2016.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/631,633 dated Sep. 10, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/813,749 dated Sep. 28, 2015.
Official Communication for U.S. Appl. No. 14/813,749 dated Apr. 8, 2016.
Official Communication for U.S. Appl. No. 14/842,734 dated Nov. 19, 2015.
Official Communication for U.S. Appl. No. 14/929,584 dated Feb. 4, 2016.
Official Communication for U.S. Appl. No. 14/929,584 dated May 25, 2016.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in18 pages.
Psaltis, Andrew G., "Streaming Data—Designing the Real-Time Pipeline," Jan. 16, 2015, vol. MEAP VO3, pp. 0-12.
Sigrist, et al., "PROSITE, a Protein Domain Database for Functional Characterization and Annotation," Nucleic Acids Research, 2010, vol. 38, pp. D161-D166.
StatCounter—Free Invisible Web Tracker, Hit Counter and Web Stats, <http://statcounter.com/> Printed Jul. 19, 2013 in 17 pages.
TestFlight—Beta Testing on The Fly, <http://testflightapp.com/> Printed Jul. 18, 2013 in 3 pages.
trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for Model Risk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.

(56) References Cited

OTHER PUBLICATIONS

Wikipedia, "Mobile Web," Jan. 23, 2015, retrieved from the internet on Mar. 15, 2016 https://en.wikipedia.org/w/index.php?title=Mobile_Web&oldid=643800164.

Windley, Phillip J., "The Live Web: Building Event-Based Connections in the Cloud," Dec. 21, 2011, pp. 10, 216.

Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.

\* cited by examiner

AUTOMATING MANAGEMENT OF INTEGRATED WORKFLOWS BASED ON DISPARATE SUBSIDIARY DATA SOURCES

BACKGROUND

Technical Field

This disclosure relates to approaches for automating management of integrated workflows, and more particularly, for allowing data sources underlying integrated workflows to be synchronized and/or updated with data sources underlying subsidiary workflows.

Description of Related Art

Many integrated workflows depend on completion of subsidiary workflows. The process of manufacturing a product that integrates many components, for instance, depends on availability of and access to each of the components. The entities manufacturing components may be independent and/or geographically remote from the entity manufacturing the integrated product. The entity manufacturing the integrated product, as well as each component manufacturer, may manage its workflows using different data sources having different access privileges and/or database formats.

Conventionally, when product or process management teams managed an integrated workflow, these teams kept hand written notes and/or individual spreadsheets that documented the status of each subsidiary workflow and its effect on the integrated workflow. The teams obtained the data for the notes/spreadsheets from disparate data sources having different access control privileges and managed by the coordinators of each subsidiary workflow. To identify delays and/or quality issues with subsidiary processes, teams managing the integrated workflow had to access a subsidiary process data source and manually update their notes and/or spreadsheet. In addition to the fact that these systems made it difficult to communicate delays, quality issues, and/or updates, these systems made it difficult for teams managing an integrated workflow to plan for issues that arose with respect to subsidiary workflows. Conventional systems made it difficult to automate management of an integrated workflow that relied on the completion of subsidiary workflows.

SUMMARY

Methods, systems, and computer-readable media described herein may include: obtaining first data from a first datastore managed by a first entity, the first data comprising a first status of a first task of a first subsidiary workflow that is part of an integrated workflow; integrating the first data into a second datastore managed by a second entity that manages the integrated workflow, with an integration layer; generating a graphical user interface to present an interactive graphical object that displays the integrated first data and the integrated workflow to a user; receiving one or more updates from the user to the integrated first data, where the one or more updates are based on one or more graphical user interactions with the integrated first data; identifying a change to a portion of the first data; and writing the change in the first datastore using the integration layer interface.

In some embodiments, writing the change to the portion of the first data comprises: updating the integrated first data in the second datastore based on the one or more updates to produce updated integrated first data; and synchronizing the first datastore and the second datastore using the updated integrated first data.

Writing the change to the portion of the first data may comprise: updating the integrated first data in the second datastore based on the one or more updates to produce updated integrated first data; and synchronizing the first datastore and the second datastore using the updated integrated first data.

In some embodiments, writing the change to the portion of the first data is performed periodically.

The interactive graphical object may comprise a graphical menu configured to display a dependency of the first task of the first subsidiary workflow and a second task of a second subsidiary workflow, the second subsidiary workflow being part of the integrated workflow.

In some implementations, the one or more graphical user interactions comprise a request to filter the integrated workflow for a filtering parameter of the integrated workflow; and the change to the portion of the first data comprises an instruction to display the integrated first data if the integrated first data is associated with the filtering parameter.

The filtering parameter may comprise a user-selected milestone of the integrated workflow selected by the user. The filtering parameter may comprise one or more parameters related to a blocking work request, or a responsible entity responsible for performance of the first task of the first subsidiary workflow.

In some embodiments, the filtering parameter may be saved as a saved filtering parameter in the second datastore; and the saved filtering parameter may be used to filter a future project utilizing the integrated workflow.

In some embodiments, the graphical user interface is configured to display the integrated first item as a virtual card associated with a first manufacturing station of a manufactured product built according to the integrated workflow. The graphical user interaction may comprise a request to move the virtual card from the first manufacturing station to a second manufacturing station of the manufactured product.

The one or more graphical user interactions may comprise a request to escalate an action item associated with the first task of the first subsidiary workflow from a first priority in the integrated workflow to a second priority in the integrated workflow.

In some embodiments, the first task is associated with a first project zone of the integrated workflow; and the method further comprises: identifying a second subsidiary workflow that is part of the integrated workflow, the second subsidiary workflow including a second task associated with a second project zone of the integrated workflow, the second project zone being independent of the first project zone; and configuring the graphical user interface to display the second data corresponding to the second task.

The first zone may be associated with a first project station of the integrated workflow, and the second zone is associated with a second project station of the integrated workflow.

In some embodiments, one or more project tags to associate with the one or more updates may be identified, the one or more project tags comprising one or more modifications to the integrated workflow based on the one or more updates. The integrated workflow may comprise a workflow to build an item comprising a plurality of components, at least one of the plurality of components being built according to the subsidiary workflow.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

FIG. 7 is a diagram of a GUI containing a dependency screen of an application supported by an integrated workflow management system, according to some embodiments.

FIG. 8 is a diagram of a GUI containing an access planning screen of an application supported by an integrated workflow management system, according to some embodiments.

FIG. 9 is a diagram of a GUI containing an access view screen of an application supported by an integrated workflow management system, according to some embodiments.

DETAILED DESCRIPTION

A claimed solution rooted in computer technology overcomes problems specifically arising in the realm of computer technology. In various implementations, a system can obtain first data (e.g., product data) from a first datastore associated with a first entity (e.g., a product manufacturer system). The system can obtain second data (e.g., contextual data relating to the product data) from a second datastore associated with a second entity (e.g., a third-party project management system). The system can use an integration layer interface to integrate the first data and the second data in a third datastore (e.g., a local datastore or cache) associated with the second entity. The system can generate a graphical user interface (GUI) presenting the integrated first and second data. The system can receive an update to a portion of the first data stored in the third datastore through the GUI. In some embodiments, the update can be received from a user that does not have access privileges for the first datastore. Although the update was received from a user without access privileges for the first datastore, the update may nonetheless be written back to the first datastore using the integration layer interface. This may help ensure, for example, that the first datastore remains current without unnecessarily granting access to privileges or otherwise compromising security of the first datastore. In some embodiments, the update may be written back to the first datastore at the same time the update is received from the user (e.g., in real-time).

Figure 1:
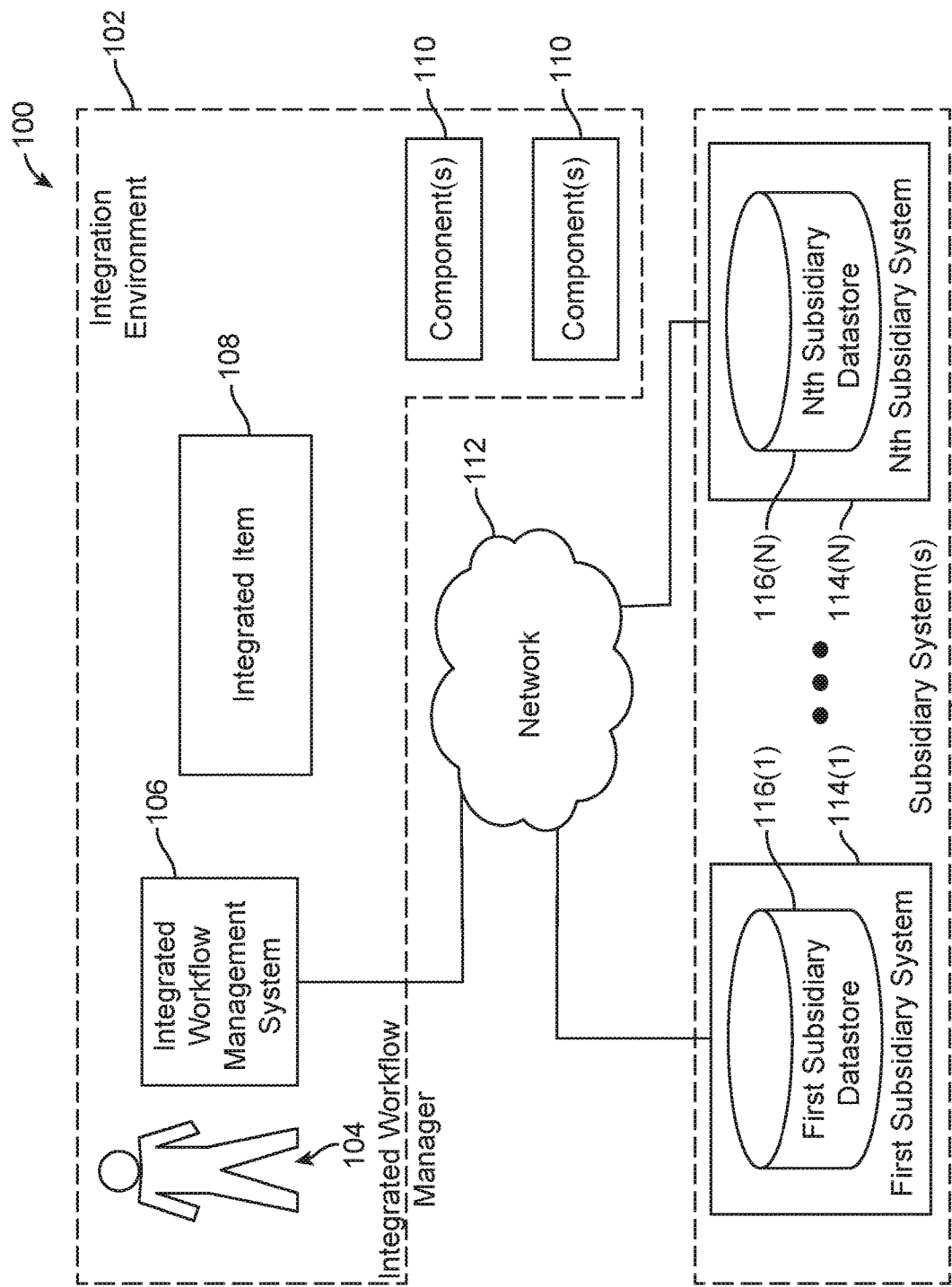
FIG. 1 is a diagram of an example of an environment for supporting an integrated workflow management system, according to some embodiments.

FIG. 1 is a diagram of an example of an environment 100 for supporting an integrated workflow management system 106, according to some embodiments. The example environment 100 shown in FIG. 1 includes an integration environment 102, a network 112, and subsidiary system(s) 114 (shown in FIG. 1 as a first subsidiary system 114(1) through an Nth subsidiary system 114(N)), each including respective subsidiary datastore(s) 116 (shown in FIG. 1 as a first subsidiary datastore 116(1) through an Nth subsidiary datastore 116(N)).

In the example of FIG. 1, the integration environment 102 includes an integrated workflow manager 104, an integrated workflow management system 106, an integrated item 108 and one or more components 110 for integration into the integrated item 108. The integration environment 102 may comprise any environment for conducting an integrated workflow. An "integrated workflow," as used herein, may include a set of process steps for performing a task using one or more subsidiary workflows. A "subsidiary workflow," as used herein, may include a set of process steps for performing a task that is included in an integrated workflow. An example of an integrated workflow includes a manufacturing process to build an integrated item made of component parts. Subsidiary workflows to such a manufacturing process may include one or more processes to build the component parts and/or have the component parts brought to the location of the integrated workflow. Examples of manufactured items that may be built in the integration environment 102 include ships, trains, other vehicles, etc. Additional examples of manufactured items that may be built in the integration environment 102 include electronics, clothing, toys, furniture, buildings, consumer items, etc. built from components, where the manufacture of each component governed by a subsidiary process. Another example of an integrated workflow includes a workflow to perform an integrated business process for an entity such as an organization or an individual. In accordance with such an example, subsidiary business processes may comprise subsidiary tasks that need to be performed in order to complete at least a portion of the integrated business process. In various embodiments, the integrated workflow may be managed by a first entity while subsidiary processes may be managed by one or more second entities.

The integrated workflow manager 104 may include a person or a business that manages an integrated workflow executed in the integration environment 102. In various embodiments, the integrated workflow manager 104 is a user who provides instructions to manage the integrated workflow through the integrated workflow management system 106. The instructions may include specific instructions to identify whether or not subsidiary processes of the integrated process are being performed according to schedule, cost, quality, and/or other metrics. In various embodiments, the integrated workflow manager 104 is associated with the first entity that manages the integrated workflow. To that extent, the integrated workflow manager 104 may have access to restricted portions of the integrated workflow without having access to restricted portions of subsidiary workflows.

The integrated workflow management system 106 may include one or more computer systems configured to automate the integrated workflow conducted in the integration environment 102 and/or manage subsidiary workflows associated with the component(s) 110. The integrated workflow management system 106 may provide a graphical user interface (GUI) that allows the integrated workflow manager 104 to manage tasks related to the integrated workflow. In some embodiments, the integrated workflow management system 106 supports an integration layer that gathers data about subsidiary workflows from the subsidiary datastore(s) 116. An "integration layer," as used herein, may include a set of processes, applications, etc. configured to facilitate integration of data from the subsidiary datastore(s) 116 into integration datastores in the integrated workflow management system 106. An integration layer may further include a set of processes, applications, etc. configured to synchronize updates to the integration datastores in the integrated workflow management system 106 with subsidiary datastore(s) 116. As noted herein, the synchronization may occur in real-time or may occur at specified periods, such as at several specified times over the course of a specific day.

In some embodiments, the integrated workflow management system 106 supports perspectives of an integrated workflow and/or relevant subsidiary workflows. The integrated workflow management system 106 may support prioritization perspectives that display information about milestones in an integrated workflow. A "milestone" of an integrated workflow, as used herein, may include any event of importance related to the integrated workflow, including but not limited to, key tasks, key dates of completion of tasks, key relationships between tasks, key relationships between tasks in a subsidiary workflow and tasks in an integrated workflow, etc. In some implementations, the information related to milestones may include statuses, the number of outstanding blocking work requests, types of relationships to tasks in subsidiary workflows, responsible parties, etc.

The integrated workflow management system 106 may support dependency perspectives that facilitate visualization of dependencies of tasks of different subsidiary workflows on each other and/or dependencies of tasks of subsidiary workflows on an integrated workflow. Dependency perspectives may support filters that create custom tasks of interest in the integrated workflow and/or lists of tasks in the integrated workflow that update automatically upon changes to their states. Dependency perspectives may allow the integrated workflow manager 104 to search and/or filter tasks in a subsidiary workflow and/or tasks in an integrated workflow. The dependency perspectives may allow the integrated workflow manager 104 to share dependency perspectives by, e.g., copying and pasting links that can be emailed to other users. In some embodiments, the dependency perspectives may save searches/filters of integrated workflow and allow future users to access saved searches/filters. In some embodiments, the dependency perspectives allow the integrated workflow manager 104 to search for specific words, work request numbers, and/or other phrases related to an integrated workflow. The dependency perspectives may further allow the integrated workflow manager 104 to view information about specific tasks, create folders related to tasks, add tasks to folders, updating milestones, setting how data is displayed, sorting changes, conversations (e.g., users' online discussions about tasks), sharing tasks by exporting to various file formats, etc.

The integrated workflow management system 106 may support access view perspectives that allow an integrated workflow manager 104 to select one or more access zones of an integrated workflow. An "access zone," as used herein, may include a physical area for performing a part of an integrated workflow in which specified personnel have access to at a given time. An access zone may correspond to a physical area that a component is built in according to a subsidiary workflow related to an integrated workflow. In the manufacturing context, an access zone may comprise a specific area that is accessible for a first task, and that may not be accessible for a second task until the first task has been completed. In some embodiments, an access view perspective may reflect updates made in real time when access planning, or planning for access to specific access zones.

The integrated workflow management system 106 may further support access planning perspectives that allow an integrated workflow manager 104 to plan access to specific access zones. The access planning perspectives may allow the integrated workflow manager 104 to enter and/or alter access information for various access zones on a given day and/or given time.

The integrated item 108 may comprise any item on which an integrated workflow is performed. In some embodiments, the integrated item may comprise a manufactured item. The integrated item may comprise an integrated business process and/or the result of an integrated business process. The component(s) 110 may comprise components to be integrated into the integrated item 108 using the integrated workflow. The component(s) 110 may include manufactured elements to be integrated into the integrated item 108, elements of subsidiary business processes subsidiary to an integrated business process, etc. In various embodiments, the component(s) 110 are managed by an entity distinct from the entity associated with the integrated workflow manager 104. Each of the component(s) 110 may be managed by common entities or by distinct entities.

The subsidiary system(s) 114 may include one or more computer systems configured to support subsidiary workflows. The subsidiary system(s) 114 may each include respective subsidiary datastore(s) 116. The subsidiary datastore(s) 116 may store information related to subsidiary workflows, such as identifiers and/or locations of components, identifiers of data in subsidiary business processes, etc. The subsidiary system(s) 114 may be managed by entities that provide the component(s) 110. The entities that provide the component(s) 110 may be distinct from the entity that manages an integrated process. The entities that provide the component(s) 110 may be distinct from one another or may be common entities.

The elements of the environment 100 may operate to support integrated workflows managed by the integrated workflow management system 106. In some embodiments, the integrated workflow management system 106 may receive instructions from the integrated workflow manager 104 to manage an integrated workflow related to the integrated item 108. The integrated workflow may be related to one or more subsidiary workflows. The subsidiary workflows may be related assembly, transportation, or arrangement of the component(s) 110, and may be managed by component data stored in the subsidiary datastore(s) 116 of the subsidiary system(s) 114. The integrated workflow management system 106 may gather from the subsidiary system(s) 114 data related to the component(s) 110, including data used to identify, arrange, and/or coordinate the component(s) 110 within the integration environment 102. The integrated workflow management system 106 may further display a GUI that displays the integrated workflow in a manner that facilitates visual interactions with the integrated workflow. The GUI may be configured to display prioritization perspectives, dependency perspectives, access view perspectives, access planning perspectives, etc. The integrated workflow management system 106 may receive instructions to interact with the integrated workflow, such as instructions to modify identifiers, locations, arrangements, etc. of the component(s) 110. In various embodiments, the integrated workflow management system 106 may provide instructions to synchronize the subsidiary datastore(s) 116 with datastores that represent a state of an integrated workflow and/or subsidiary workflows. As noted herein, an integration layer in the integrated workflow management system 106 may operate to support synchronizing the subsidiary datastore(s) 116 with datastores in the integrated workflow management system 106.

Figure 2:
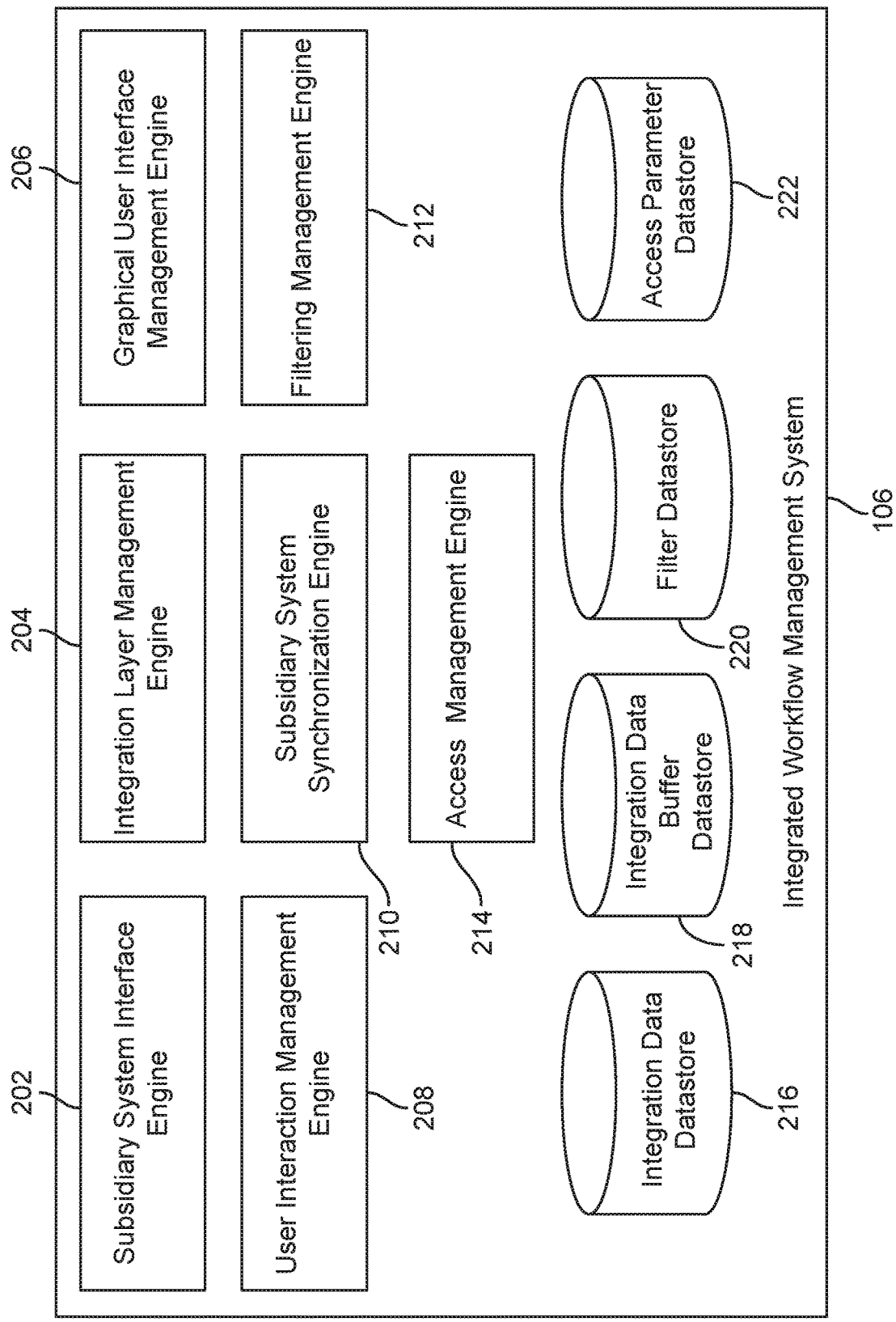
FIG. 2 is a diagram of an example of an integrated workflow management system, according to some embodiments.

FIG. 2 is a diagram of an example of an integrated workflow management system 106, according to some embodiments. The integrated workflow management system 106 includes a subsidiary system interface engine 202, an integration layer management engine 204, a GUI management engine 206, a user interaction management engine 208, a subsidiary system synchronization engine 210, a filtering management engine 212, an access management engine 214, an integration data datastore 216, an integration data buffer datastore 218, a filter datastore 220, and an access parameter datastore 222.

The subsidiary system interface engine 202 may be configured to send data to and receive data from the subsidiary system(s) 114. The subsidiary system interface engine 202 may provide queries to subsidiary datastore(s) 116 and receive datastore entries corresponding to those queries. In various implementations, the subsidiary system interface engine 202 gathers data related to identifying, locating, arranging, etc. components. As various examples, the subsidiary system interface engine 202 may gather identifiers, locations, arrangements, etc. of subsidiary components and/or subsidiary business processes. The subsidiary system interface engine 202 may incorporate network hardware and/or software that provides data to/from the subsidiary system(s) 114 in a network-compatible format.

The integration layer management engine 204 may be configured to support an integration layer that facilitates integration of data gathered from the subsidiary datastore(s) 116 into data in the integration data datastore 216. The integration layer management engine 204 may include instructions that translate identifiers, locations, arrangements, etc. of subsidiary workflows in the subsidiary datastore(s) 116 into identifiers, locations, arrangements, etc. of integrated workflows. In some embodiments, the integration layer management engine 204 may correlate roles of components with roles in an integrated workflow. The integration layer management engine 204 may correlate physical locations of components used in an integrated workflow with specific locations of items in the integrated workflow and/or process steps of the integrated workflow. The integration layer management engine 204 may correlate configurations of components used in an integrated workflow with specific configurations of items in the integrated workflow and/or process steps of the integrated workflow.

The GUI management engine 206 may be configured to generate one or more GUIs for display on the integrated workflow management system 106. The GUI management engine 206 may gather parameters to render a GUI used to manage an integrated workflow, and may render the GUI on a display. The GUI may be configured to display prioritization perspectives, dependency perspectives, access view perspectives, access planning perspectives, etc., as noted herein. The GUI may be configured to receive instructions from the integrated workflow manager.

The user interaction management engine 208 may be configured to receive user interactions with a GUI rendered on a display of the integrated workflow management system 106. In some embodiments, the user interaction management engine 208 may be coupled to input devices of the integrated workflow management system 106. The user interaction management engine 208 may receive instructions from the input devices to select, edit, modify, enter information into, etc. a GUI rendered by the GUI management engine 206. In various embodiments, the user interaction management engine 208 manages user interactions entered into an integrated workflow application managed by the integrated workflow management system 106. More particularly, the user interaction management engine 208 may manage edits, updates, etc. to portions of an integrated workflow, such as edits, updates, etc. to attributes, locations, and/or configurations of components used in an integrated workflow. The user interaction management engine 208 may identify modifications by the integrated workflow manager 104 of a GUI generated by the GUI management engine 206. In some embodiments, the user interaction management engine 208 stores data that the integrated workflow manager 104 has entered since the last synchronization with the subsidiary datastore(s) 116 until the subsidiary system synchronization engine 210 writes additional data to the subsidiary datastore(s) 116. In some embodiments, the user interaction comprises a graphical user interaction. The graphical user interface may be configured to display the integrated first item as a virtual card associated with a first manufacturing station of a manufactured product built according to the integrated workflow. A "virtual card," as used herein, may refer to a visual depiction of a task in an integrated workflow that can be moved around as a virtual tile in a GUI. The graphical user interaction may comprise a request to move the virtual card from the first manufacturing station to a second manufacturing station of the manufactured product. The graphical user interaction comprise a request to escalate an action item associated with the first task of the first subsidiary workflow from a first priority in the integrated workflow to a second priority in the integrated workflow. The user interaction management engine 208 may provide user interactions to other modules of the integrated workflow management system 106.

The subsidiary system synchronization engine 210 may be configured to synchronize the integration data datastore 216 with subsidiary datastore(s) 116. The subsidiary system synchronization engine 210 may use an integration layer managed by the integration layer management engine 204 to perform reads, writes, and/or other operations to the subsidiary datastore(s) 116. In some implementations, the subsidiary system synchronization engine 210 reads data from the subsidiary datastore(s) 116 and writes that data to the integration data datastore 216. The subsidiary system synchronization engine 210 may further read data from the integration data datastore 216 and write that data to the subsidiary datastore(s) 116. In some embodiments, the subsidiary system synchronization engine 210 performs synchronizations periodically (regular intervals of minutes, hours, days, etc.), upon occurrence of an event (at a specified time or occurrence of a physical event), etc.

The filtering management engine 212 may be configured to apply filters from the filter datastore 220. In some embodiments, the filters include dependency filters that that are used to dependencies of integrated workflow managers, specific tasks, locations, and/or components used in an integrated item. The filtering management engine 212 may, for instance, include filters that identify the relationships of components to one another and/or to an integrated item. In some embodiments, the filtering management engine 212 receives specific requests to filter data from the user interaction management engine 208. In response to these requests, the filtering management engine 212 may apply filters gathered from the filter datastore 220 to the data. The filtering management engine 212 may further provide the filtered data to the GUI management engine 206.

The access management engine 214 may be configured to apply access views and/or facilitate access planning of an integrated workflow. The access management engine 214 may gather access views for data from the access parameter datastore 222. The access views may specify specific areas of an integrated workflow to which the integrated workflow manager 104 and/or other personnel have access to at a specified time. The access views may further specify specific process steps of an integrated workflow to which the integrated workflow manager 104 and/or other personnel may perform at a specified time. The access management engine 214 may further gather access planning data from the access parameter datastore 222. The access planning data may comprise data to facilitate planning of access to various areas, process steps, etc. of an integrated workflow.

The integration data datastore 216 may be configured to store data related to one or more integrated workflows. The integration data datastore 216 may be configured to store attributes, locations, arrangements, of specific integrated items. In some embodiments, the integration data datastore 216 is configured to store configurations, part numbers, sequences of operations, etc. of an integrated workflow for manufacturing an integrated product. The integration data datastore 216 may be configured to store configurations, part numbers, sequences of operations, etc. of integrated business processes. The integration data buffer datastore 218 may include a buffer of recent modifications to an integration workflow. In some embodiments, the integration data buffer datastore 218 is cleaned, erased, etc. every time the subsidiary system synchronization engine 210 performs data synchronization.

The filter datastore 220 may be configured to store data related to filters. In some embodiments, the filter datastore 220 may store filtering parameters used to filter data. The filtering parameters may include user-selected filtering parameters as well as filtering parameters set for a particular context, such as for a particular integrated workflow. The filtering parameters may include dependency filters for identifying dependencies of integrated workflow managers, specific tasks, locations, and/or components used in an integrated item. The access parameter datastore 222 may include a datastore for storing access parameters to integrated workflows.

Figure 3:
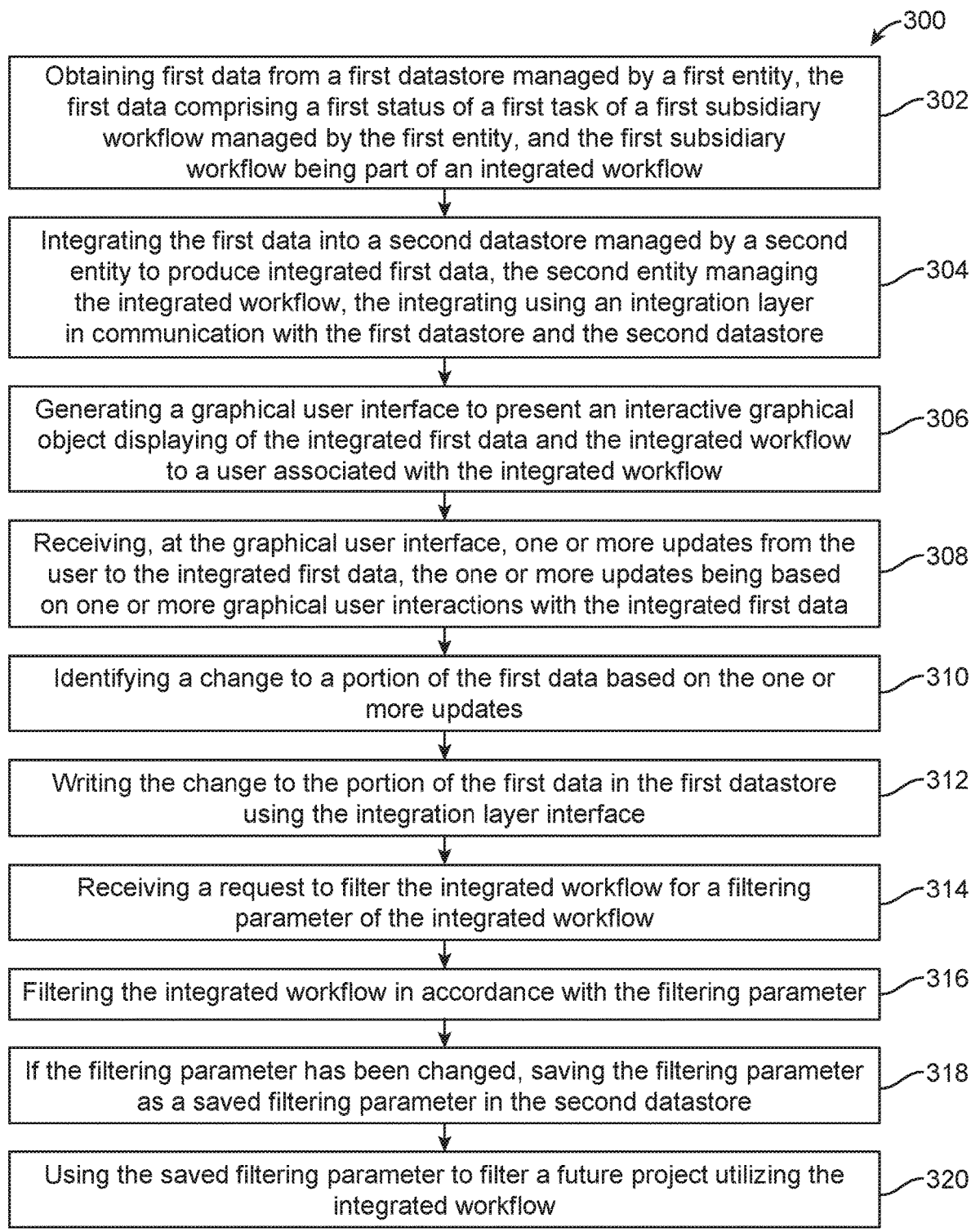
FIG. 3 is a flowchart of an example of a method for automated management of integrated workflows, according to some embodiments.

FIG. 3 is a flowchart of an example of a method 300 for automated management of integrated workflows, according to some embodiments. In this and other flowcharts, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

At an operation 302, first data may be obtained from a first datastore managed by a first entity. The first data may comprise a first status of a first task of a first subsidiary workflow managed by the first entity. The first subsidiary workflow may be part of an integrated workflow. In some embodiments, the subsidiary system interface engine 202 may obtain first data from the subsidiary datastore(s) 116. The first data may comprise a first status of a first task of a task associated with the component(s) 110 and managed an entity that manages the subsidiary system(s) 114.

At an operation 304, the first data may be integrated into a second datastore managed by a second entity to produce integrated first data. The second entity may manage the integrated workflow. The integration may use an integration layer in communication with the first datastore and the second datastore. In some embodiments, the integration layer management engine 204 may provide an integration layer to integrate the data from the subsidiary datastore(s) 116 into the integration data datastore 216. As noted herein, the entity associated with the integrated workflow management system 106 may be managed by an entity different than the entity that manages the subsidiary system(s) 114.

At an operation 306, a graphical user interface used to present an interactive graphical object that displays of the integrated first data and the integrated workflow to a user associated with the integrated workflow may be generated. The GUI management engine 206 may generate such a GUI. At an operation 308, one or more updates from the user to the integrated first data may be received at the GUI. The one or more updates may be based on one or more graphical user interactions with the integrated first data. The user interaction management engine 208 may process these updates. At an operation 310, a change to a portion of the first data based on the one or more updates may be identified. In various embodiments, the user interaction management engine 208 may receive user input from the integrated workflow manager 104 to interact with integrated first data and the integrated workflow displayed on the GUI. The user interaction management engine 208 may provide changes to the integration layer management engine 204.

Figure 4A:
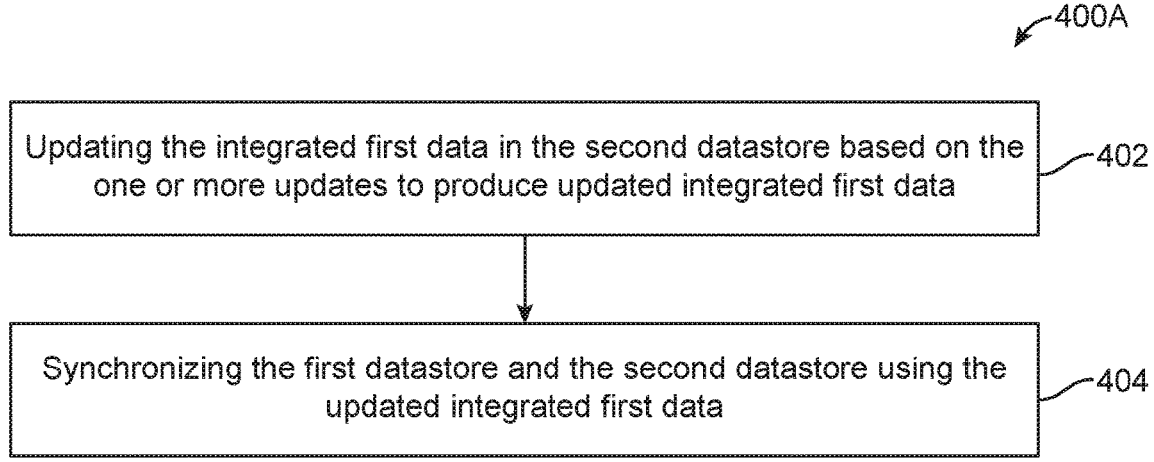
FIGS. 4A and 4B are flowcharts of examples of methods for automated management of integrated workflows, according to some embodiments.

At an operation 312, the change to the portion of the first data in the first datastore may be written using the integration layer interface. The integration layer management engine 204 may use the integration layer to instruct the subsidiary system synchronization engine 210 to write changes of the first data to the subsidiary datastore(s) 116. FIG. 4A shows an example of the operation 312.

At an operation 314, a request to filter the integrated workflow for a filtering parameter of the integrated workflow may be received. The user interaction management engine 208 may receive requests to filter the integrated workflow for a filtering parameter. The user interaction management engine 208 may provide those requests to the filtering management engine 212. The filtering management engine 212 may gather filter parameters from the filter datastore 220 to apply to the integrated workflow. At an operation 316, the integrated workflow may be filtered in accordance with the filtering parameter. The filtering management engine 212 may apply relevant filters to the integrated workflow. The GUI management engine 206 may be configured to display a filtered integrated workflow accordingly.

Figure 4B:
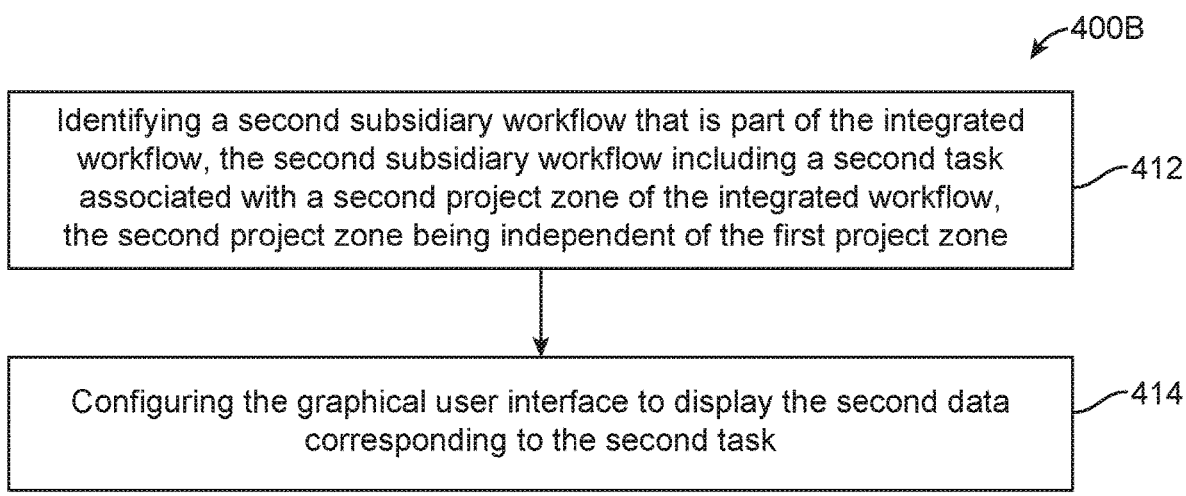

At an operation 318, if the filtering parameter has been changed, using the filtering parameter may be saved as a saved filtering parameter in the second datastore. The filtering management engine 212 may, if the filtering parameter, is modified, save the modified filtering parameter in the filter datastore 220. At an operation 320, the saved filtering parameter may be used to filter a future project utilizing the integrated workflow FIGS. 4A and 4B are flowcharts of examples of methods for automated management of integrated workflows, according to some embodiments. In these flowcharts, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

Turning to FIG. 4A, the flowchart depicts an example of a method 400A of writing changes to a portion of the first data in the first datastore. At an operation 402, the integrated data in the second datastore may be updated based on the one or more updates to produce updated integrated first data. At an operation 404, the first datastore and the second datastore may be synchronized using the updated integrated data.

Turning to FIG. 4B, the method depicts an example of a method 400B of configuring a GUI to display second data for a second task. At an operation 412, a second subsidiary workflow that is part of the integrated workflow may be identified. The second subsidiary workflow may include a second task associated with a second project zone of the integrated workflow. The second project zone may be independent of the first project zone. At an operation 414, the GUI may be configured to the second data corresponding to the second task.

Figure 5:
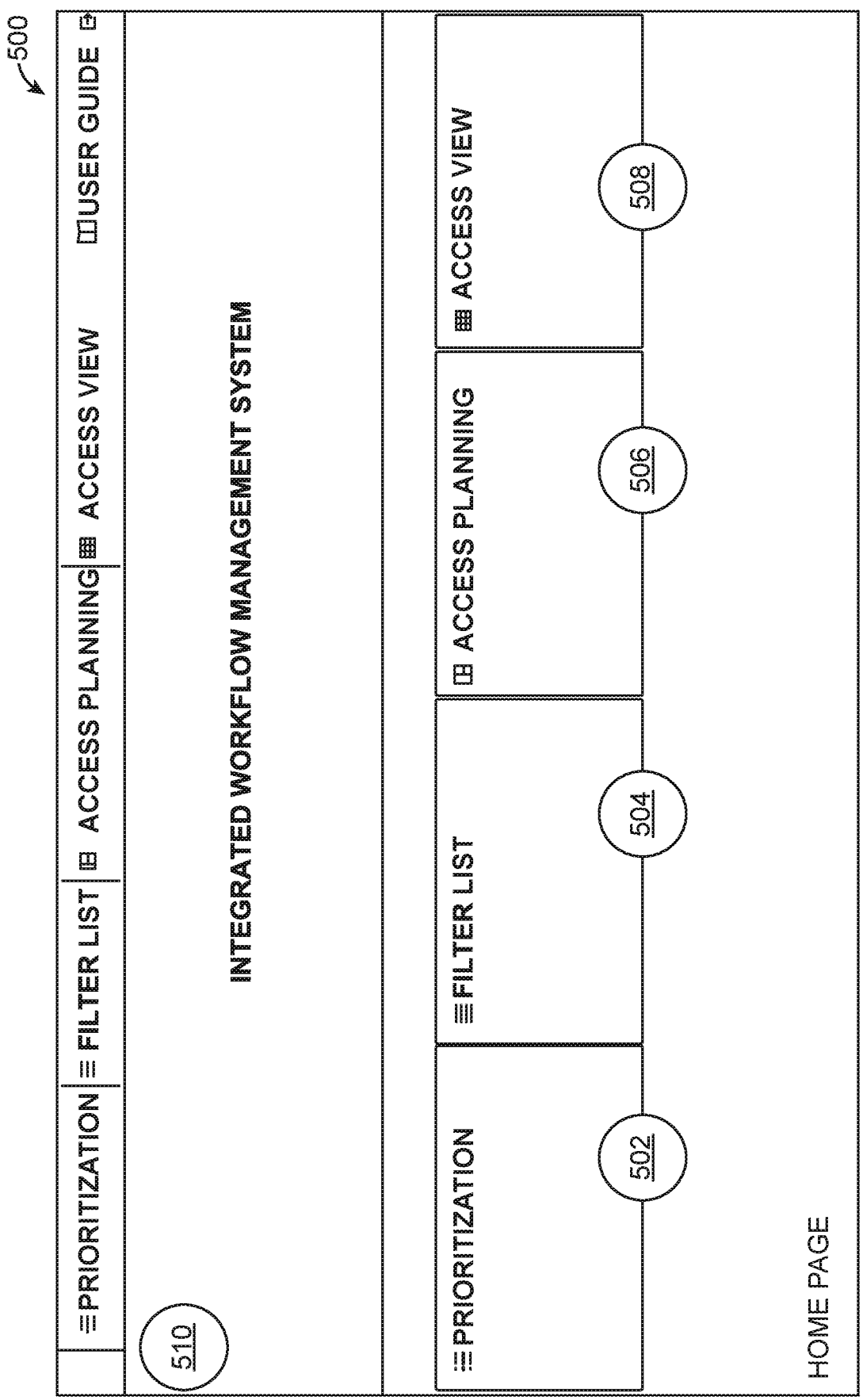
FIG. 5 is a diagram of a GUI containing a home page of an application supported by an integrated workflow management system, according to some embodiments.

FIG. 5 is a diagram of a GUI 500 containing a home page of an application supported by an integrated workflow management system, according to some embodiments. The GUI 500 includes a prioritization GUI element 502 that allows a user to navigate to the prioritization screen of the GUI 600 shown in FIG. 6. The GUI 500 further includes a filter GUI element 504 that allows a user to navigate to the dependency screen of the GUI 700 shown in FIG. 7. The GUI 500 also includes an access planning GUI element 506 that allows a user to navigate to the access planning screen of the GUI 800 shown in FIG. 8. The GUI 500 further includes an access planning GUI element 506 that allows a user to navigate to the access planning screen of the GUI 800 shown in FIG. 8. The GUI 500 includes an access view GUI element 508 that allows a user to navigate to the access view screen of the GUI 900 shown in FIG. 9.

Figure 6:
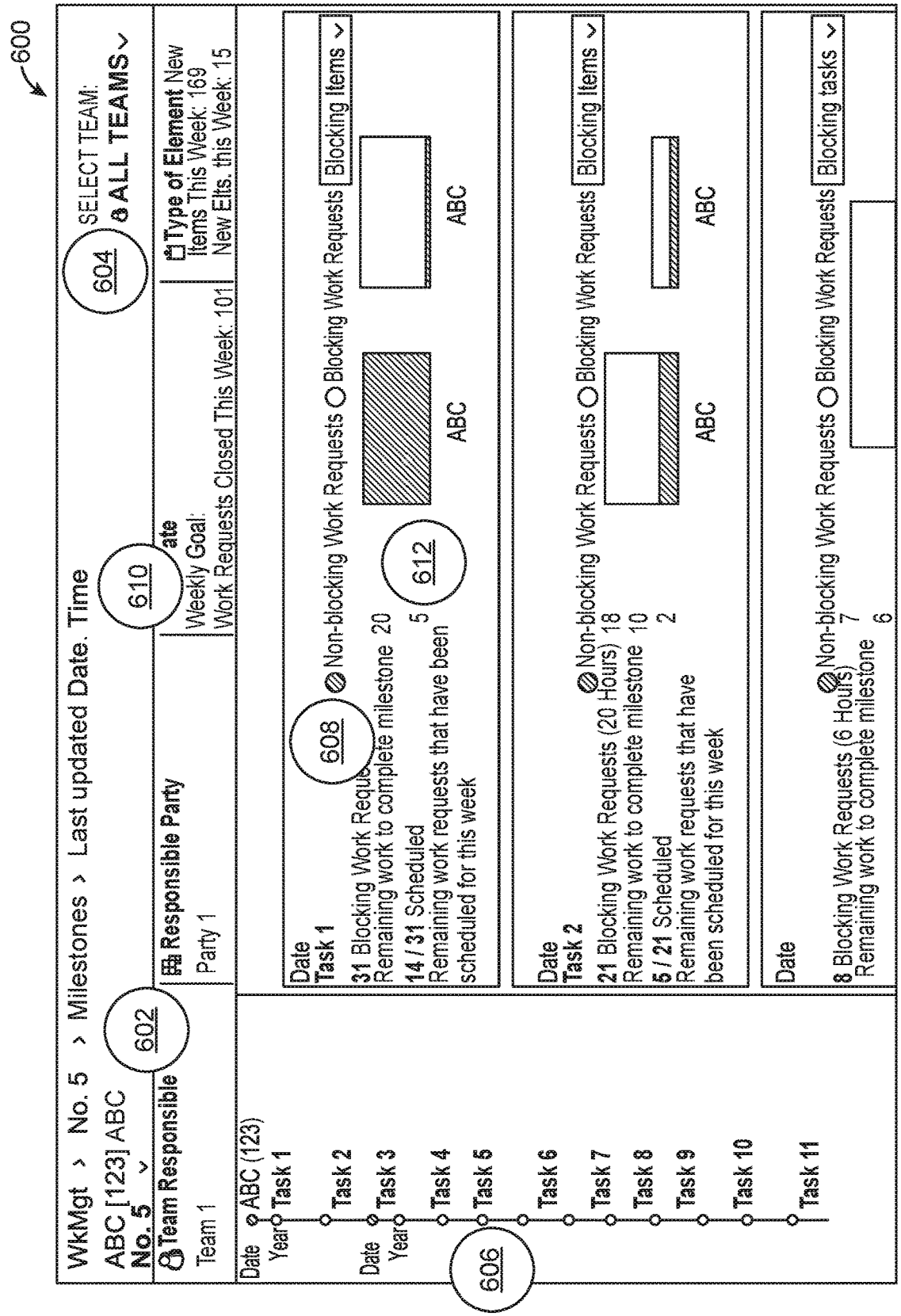
FIG. 6 is a diagram of a GUI containing a prioritization screen of an application supported by an integrated workflow management system, according to some embodiments.

FIG. 6 is a diagram of a GUI 600 containing a prioritization screen of an application supported by an integrated workflow management system, according to some embodiments. The GUI 600 includes a milestone selection GUI element 602, a team selection GUI element 604, a milestone tracking GUI element 606, a milestone status GUI element 608, a team data identification GUI element 610, and an extended analysis GUI element 612. The milestone selection GUI element 602 may allow an integrated workflow manager 104 to select milestones. The team selection GUI element 604 may allow an integrated workflow manager to select teams for an integrated workflow. The milestone tracking GUI element 606 may allow an integrated workflow manager 104 to click on system or zone milestones in a timeline that tracks milestone due dates and milestone movement by station. The milestone status GUI element 608 may allow an integrated workflow manager 104 to look through remaining, blocking work requests associated with a milestone. The team data identification GUI element 610 may allow the integrated workflow manager 104 to visualize outstanding work by team responsible, responsible party, burn rate, and type of work. The extended analysis GUI element 612 may allow an integrated workflow manager 104 to click on graphs with a number of work requests to go directly into a list of specific tasks in a dependency view.

Figure 7:
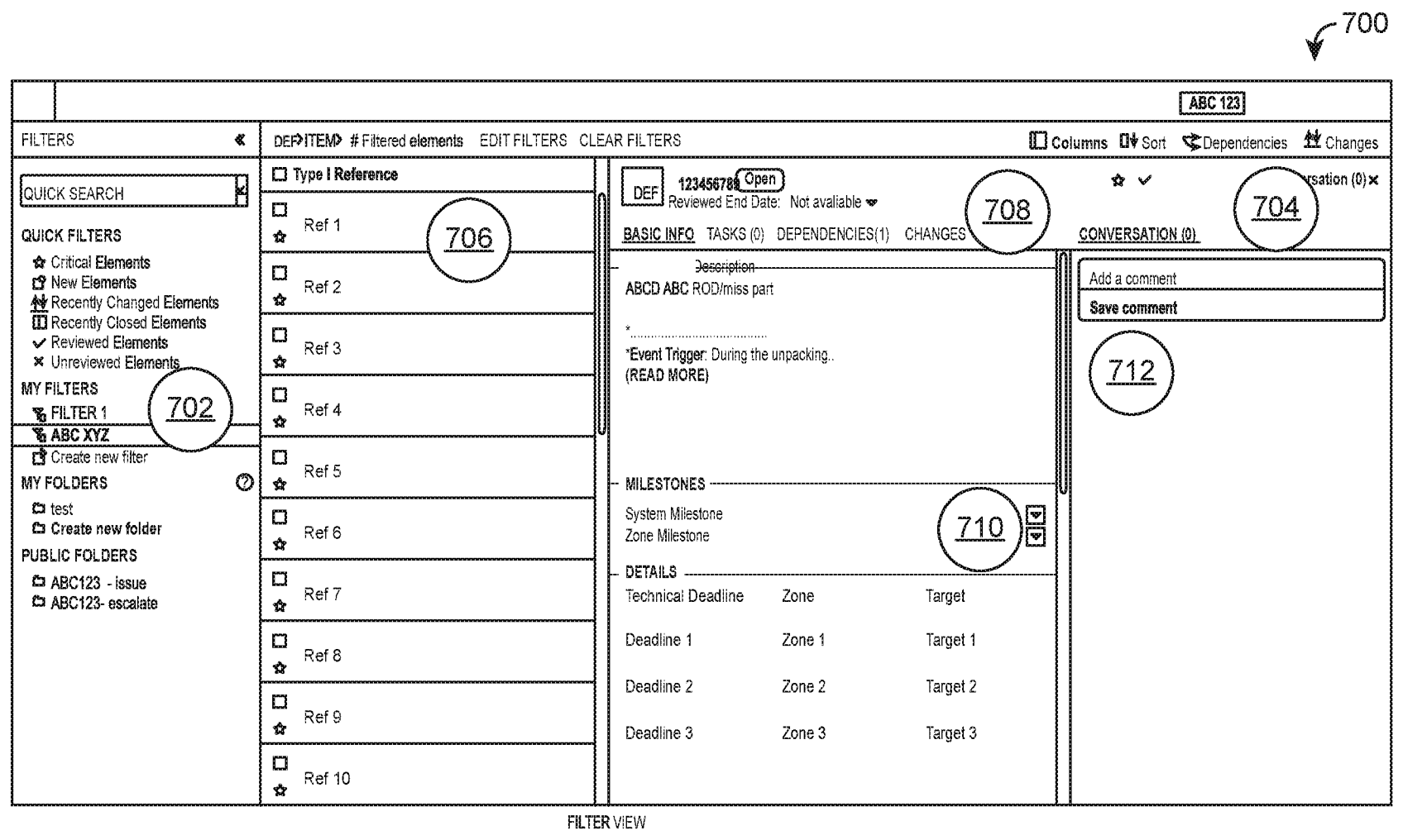

FIG. 7 is a diagram of a GUI 700 containing a dependency screen of an application supported by an integrated workflow management system, according to some embodiments. The GUI 700 includes a filter addition GUI element 702, a dependency display GUI element 704, a filter selection GUI element 706, a filter data analysis GUI element 708, a milestone tag GUI element 710, and a user comment GUI element 712. The filter addition GUI element 702 may allow the integrated workflow manager 104 to created new filters. The dependency display GUI element 704 may allow the integrated workflow manager 104 to toggle the appearance of tasks to a list the integrated workflow manager 104 has filtered on by clicking "Dependencies." The dependency display GUI element 704 may also allow the integrated workflow manager 104 to hide linked tasks. The filter selection GUI element 706 may allow the integrated workflow manager 104 to click on a task to open a details panel; the star on the left can mark a task as "critical." The checkmark on the right can allow the item to be marked as "reviewed." The tasks may become visible in the Critical and Reviewed default folders. The filter data analysis GUI element 708 may allow the integrated workflow manager 104 to view comprehensive information from the subsidiary datastore(s) 116, including historical records of comments, changes to important fields, and specific task information. The milestone tag GUI element 710 may allow the integrated workflow manager 104 to add or change system and zone milestone tags, and they will be saved and automatically added to the next milestone. "Blocking" or "non-blocking" tags may be selected to include this information. The user comment GUI element 712 may allow the integrated workflow manager 104 to enter personal comments about a task and make them visible to others.

Figure 8:
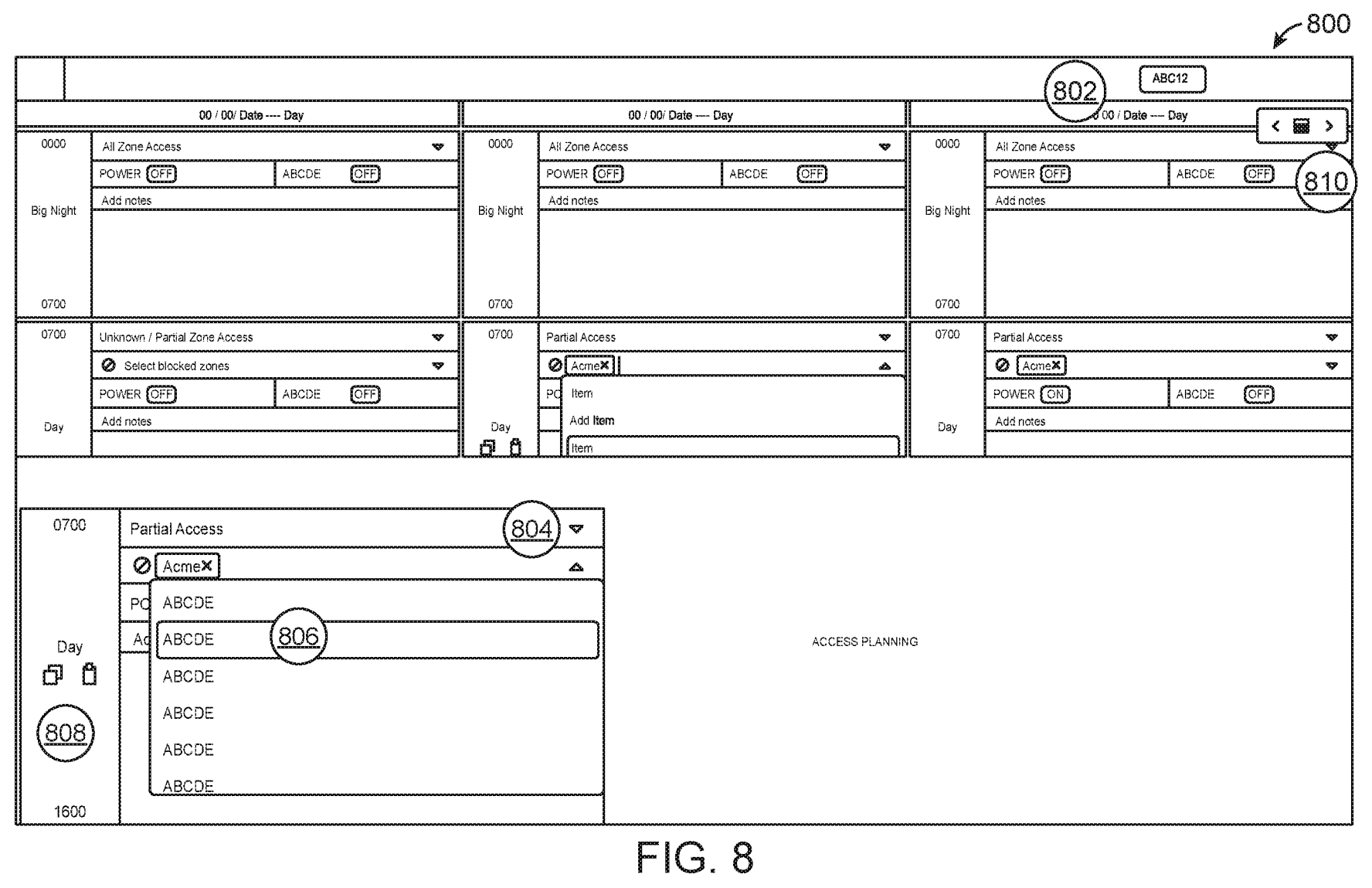

FIG. 8 is a diagram of a GUI 800 containing an access view screen of an application supported by an integrated workflow management system, according to some embodiments. The GUI 800 includes a milestone selection GUI element 802, a system status GUI element 804, a zone selection GUI element 806, a clipboard GUI element 808, and a date selection GUI element 810. The milestone selection GUI element 802 may allow the integrated workflow manager 104 to select milestones, which the integrated workflow manager 104 is planning access for. The system status GUI element 804 may allow the integrated workflow manager 104 to change access parameters for a portion of an integrated workflow. The zone selection GUI element 806 may allow the integrated workflow manager 104 to enter time zones that are blocked. The clipboard GUI element 808 may allow copying/pasting of configurations from different shifts to one another. The date selection GUI element 810 may allow the integrated workflow manager 104 to select dates for access planning.

Figure 9:
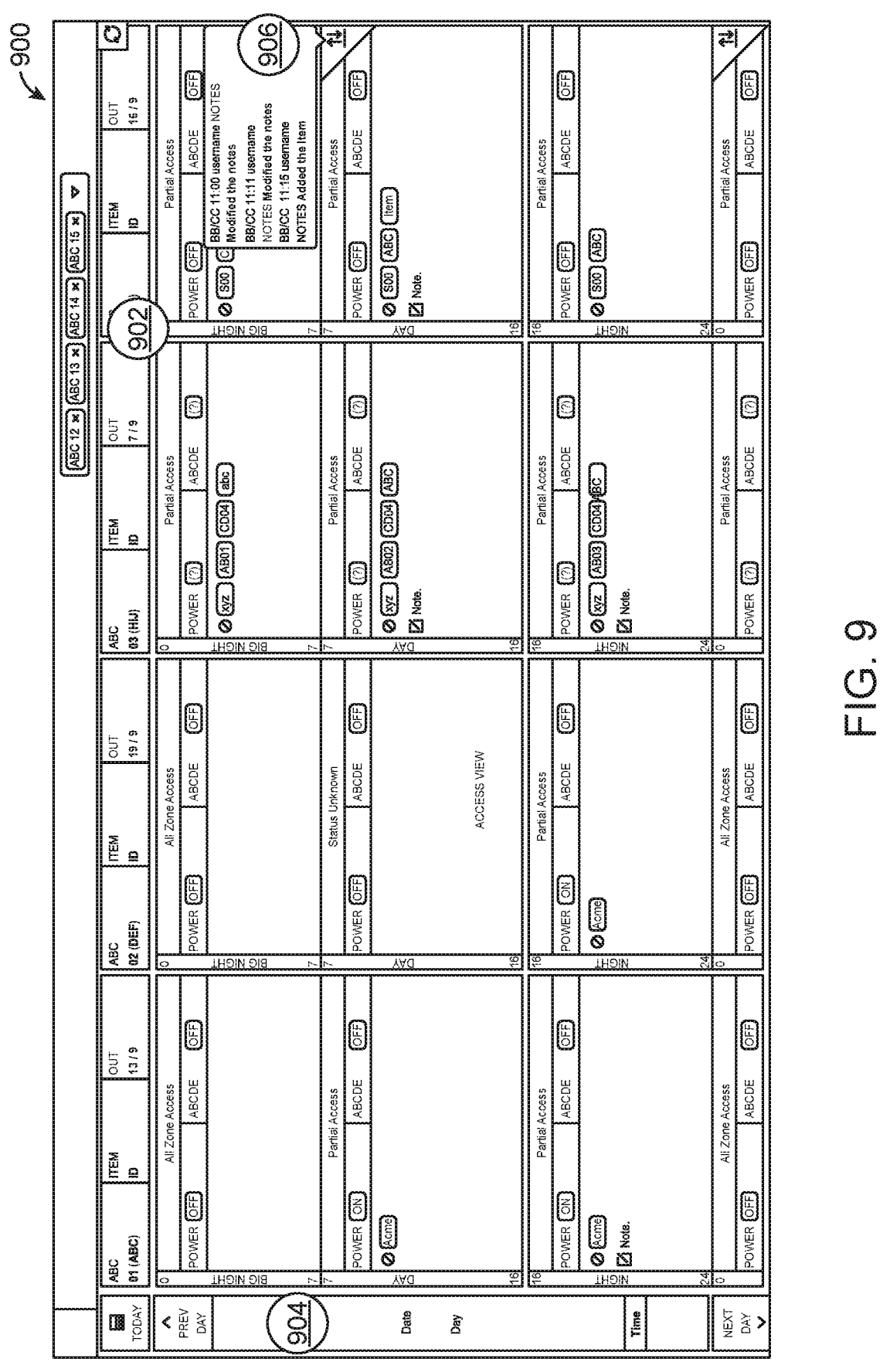

FIG. 9 is a diagram of a GUI 900 containing an access planning screen of an application supported by an integrated workflow management system, according to some embodiments. The GUI 900 includes a milestone multi-selection GUI element 902, a date selection GUI element 904, and an alert GUI element 906. The milestone multi-selection GUI element 902 may allow the integrated workflow manager 104 to select milestones by typing them into the text box to display access planning for each. The date selection GUI element 904 may allow the integrated workflow manager 104 to click the calendar icon to toggle between days. The alert GUI element 906 may allow the integrated workflow manager 104 to view alerts for changes made between specified times.

Hardware Embodiment

Figure 10:
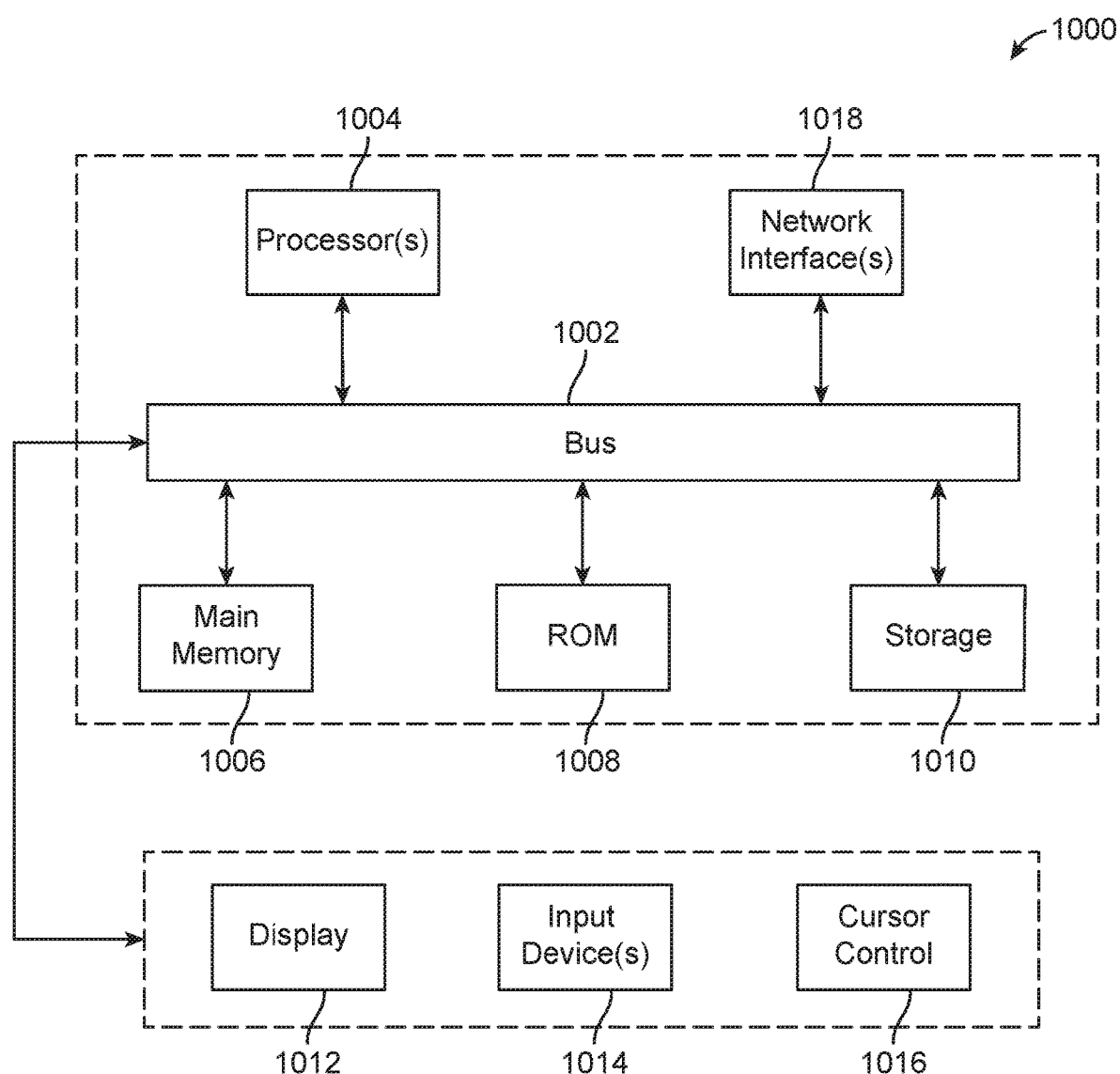
FIG. 10 depicts a block diagram of an example of a computer system upon which any of the embodiments described herein may be implemented.

FIG. 10 depicts a block diagram of an example of a computer system 1000 upon which any of the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

The computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be included of connected logic units, such as gates and flip-flops, and/or may be included of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may include non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that include bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may retrieve and execute the instructions. The instructions received by main memory 1006 may optionally be stored on storage device 1010 either before or after execution by processor 1004.

The computer system 1000 also includes a communication interface 1018 coupled to bus 1002. Communication interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such embodiment, communication interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "datastore," and/or "database" may include software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may include more, less, or functionally equivalent engines, systems, datastores, or databases, and still be within the scope of present embodiments. For example, the functionality of the various systems, engines, datastores, and/or databases may be combined or divided differently.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate embodiments are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A method comprising:

obtaining, by a computing system, first data from a first remote datastore managed by a first entity, the first data being obtained over a communication network, the first data comprising a first status of a first task of a first subsidiary workflow managed by the first entity, and the first subsidiary workflow being part of an integrated workflow, the first remote datastore being associated with a first set of access privileges;

integrating, by the computing system, the first data into a second local datastore managed by a second entity to generate integrated first data, the second local datastore being associated with a second set of access privileges, the second entity managing the integrated workflow, the integrating using an integration layer in communication with the first remote datastore and the second local datastore, the integration layer accessing the first remote datastore and the second local datastore using the first and second sets of access privileges to integrate the first data into the second local datastore based at least partially on gathering first identifiers, first locations, and first arrangements of the first subsidiary workflow from the first remote data store, and translating the first identifiers, first locations, and first arrangements of the first subsidiary workflow into corresponding second identifiers, second locations, and second arrangements of the integrated workflow;

generating, by the computing system, a graphical user interface to present one or more interactive graphical objects displaying at least a portion of the integrated first data and at least a portion of the integrated workflow to a user associated with the integrated workflow, the integrated workflow including the second identifiers, the second locations, and the second arrangements, wherein the one or more interactive graphical objects comprise a virtual card representing a visual depiction of a task in the integrated workflow;

receiving, at the graphical user interface, one or more updates from the user to the integrated first data, the one or more updates being based on one or more graphical user interactions with the integrated first data, wherein the one or more graphical user interactions comprise a request to move the virtual card from a first position in the graphical user interface to a second position in the graphical user interface, movement of the virtual card from the first position to the second position representing a change in a physical location at which the task represented by the virtual card is to be performed, wherein the user does not have access to the first remote datastore according to the first set of access privileges;

identifying, by the computing system in response to the receiving the one or more updates from the user, a change to a portion of the first data based on the one or more updates; and writing, by the computing system in response to the identifying the change, the change to the portion of the first data in the first remote datastore using the integration layer, the writing the change to the portion of the first data comprising:

updating, in response to the identifying the change, the integrated first data in the second local datastore based on the one or more updates to generate updated integrated first data; and synchronizing, by the integration layer in response to the identifying the change, the first remote datastore and the second local datastore using the updated integrated first data, the integration layer using the first and second sets of access privileges to perform the synchronizing without requiring user input.

2. The method of claim 1, wherein the one or more interactive graphical objects further comprise a graphical menu configured to display a dependency of the first task of the first subsidiary workflow and a second task of a second subsidiary workflow, the second subsidiary workflow being part of the integrated workflow.

3. The method of claim 2, wherein:

the one or more graphical user interactions further comprise a request to filter the integrated workflow for a filtering parameter of the integrated workflow; and the change to the portion of the first data comprises an instruction to display the integrated first data if the integrated first data is associated with the filtering parameter.

4. The method of claim 3, wherein the filtering parameter comprises a user-selected milestone of the integrated workflow selected by the user.

5. The method of claim 3, wherein the filtering parameter comprises one or more parameters related to a blocking work request, or a responsible entity responsible for performance of the first task of the first subsidiary workflow.

6. The method of claim 3, further comprising:
if the filtering parameter has been changed, saving the filtering parameter as a saved filtering parameter in the second local datastore; and
using the saved filtering parameter to filter a future project utilizing the integrated workflow.

7. The method of claim 1, wherein the change in the physical location at which the task represented by the virtual card is to be performed comprises a change from a first manufacturing station at which a manufactured product is at least partially built according to the integrated workflow to a second manufacturing station at which the manufactured product is at least partially built according to the integrated workflow.

8. The method of claim 1, wherein the one or more graphical user interactions further comprise a request to escalate an action item associated with the first task of the first subsidiary workflow from a first priority in the integrated workflow to a second priority in the integrated workflow.

9. The method of claim 1, wherein:
the first task of the first subsidiary workflow is associated with a first project zone of the integrated workflow; and
the method further comprises:
identifying a second subsidiary workflow that is part of the integrated workflow, the second subsidiary workflow including a second task associated with a second project zone of the integrated workflow, the second project zone being independent of the first project zone; and
configuring the graphical user interface to display the second data corresponding to the second task.

10. The method of claim 9, wherein the first zone is associated with a first project station of the integrated workflow, and the second zone is associated with a second project station of the integrated workflow.

11. The method of claim 1, further comprising identifying one or more project tags to associate with the one or more updates, the one or more project tags comprising one or more modifications to the integrated workflow based on the one or more updates.

12. The method of claim 1, wherein the integrated workflow comprises a workflow to build an item comprising a plurality of components, at least one of the plurality of components being built according to the first subsidiary workflow.

13. The method of claim 12, wherein the item comprises a ship, a train, or other vehicle.

14. A system comprising:
one or more processors; and
memory storing instructions that, when executed by the one or more processors, cause the system to perform:
integrating, by the computing system, the first data into a second local datastore managed by a second entity to generate integrated first data, the second local datastore being associated with a second set of access privileges, the second entity managing the integrated workflow, the integrating using an integration layer in communication with the first remote datastore and the second local datastore, the integration layer accessing the first remote datastore and the second local datastore using the first and second sets of access privileges to integrate the first data into the second local datastore based at least partially on gathering first identifiers, first locations, and first arrangements of the first subsidiary workflow from the first remote data store, and translating the first identifiers, first locations, and first arrangements of the first subsidiary workflow into corresponding second identifiers, second locations, and second arrangements of the integrated workflow;
generating, by the computing system, a graphical user interface to present one or more interactive graphical objects displaying at least a portion of the integrated first data and at least a portion of the integrated workflow to a user associated with the integrated workflow, the integrated workflow including the second identifiers, the second locations, and the second arrangements, wherein the one or more interactive graphical objects comprise a virtual card representing a visual depiction of a task in the integrated workflow;
receiving, at the graphical user interface, one or more updates from the user to the integrated first data, the one or more updates being based on one or more graphical user interactions with the integrated first data, wherein the one or more graphical user interactions comprises a request to move the virtual card from a first position in the graphical user interface to a second position in the graphical user interface, movement of the virtual card from the first position to the second position representing a change in a physical location at which the task represented by the virtual card is to be performed, wherein the user does not have access to the first remote datastore according to the first set of access privileges;
identifying, by the computing system in response to the receiving the one or more updates from the user, a change to a portion of the first data based on the one or more updates; and
writing, by the computing system in response to the identifying the change, the change to the portion of the first data in the first remote datastore using the integration layer, the writing the change to the portion of the first data comprising:
updating, in response to the identifying the change, the integrated first data in the second local datastore based on the one or more updates to generate updated integrated first data; and
synchronizing, by the integration layer in response to the identifying the change, the first remote datastore and the second local datastore using the updated integrated first data, the integration layer using the first and second sets of access privileges to perform the synchronizing without requiring user input.

15. A non-transitory computer readable medium configured to store program instructions, the program instructions configured to instruct one or more processors to perform a computer-implemented method, the computer-implemented method comprising:
integrating, by the computing system, the first data into a second local datastore managed by a second entity to generate integrated first data, the second local datastore being associated with a second set of access privileges, the second entity managing the integrated workflow, the integrating using an integration layer in communication with the first remote datastore and the second local datastore, the integration layer accessing the first remote datastore and the second local datastore using the first and second sets of access privileges to integrate the first data into the second local datastore based at least partially on gathering first identifiers, first locations, and first arrangements of the first subsidiary workflow from the first remote data store, and translating the first identifiers, first locations, and first arrangements of the first subsidiary workflow into corresponding second identifiers, second locations, and second arrangements of the integrated workflow;

generating, by the computing system, a graphical user interface to present one or more interactive graphical objects displaying at least a portion of the integrated first data and at least a portion of the integrated workflow to a user associated with the integrated workflow, the integrated workflow including the second identifiers, the second locations, and the second arrangements, wherein the one or more interactive graphical objects comprise a virtual card representing a visual depiction of a task in the integrated workflow;

receiving, at the graphical user interface, one or more updates from the user to the integrated first data, the one or more updates being based on one or more graphical user interactions with the integrated first data, wherein the one or more graphical user interactions comprises a request to move the virtual card from a first position in the graphical user interface to a second position in the graphical user interface, movement of the virtual card from the first position to the second position representing a change in a physical location at which the task represented by the virtual card is to be performed, wherein the user does not have access to the first remote datastore according to the first set of access privileges;

identifying, by the computing system in response to the receiving the one or more updates from the user, a change to a portion of the first data based on the one or more updates; and writing, by the computing system in response to the identifying the change, the change to the portion of the first data in the first remote datastore using the integration layer, the writing the change to the portion of the first data comprising:
  updating, in response to the identifying the change, the integrated first data in the second local datastore based on the one or more updates to generate updated integrated first data; and
  synchronizing, by the integration layer in response to the identifying the change, the first remote datastore and the second local datastore using the updated integrated first data, the integration layer using the first and second sets of access privileges to perform the synchronizing without requiring user input.

* * * * *